United States Patent
Faruque et al.

(10) Patent No.: US 11,958,430 B1
(45) Date of Patent: Apr. 16, 2024

(54) BODY-MOUNTED AIRBAG ABOVE DOOR OPENING

(71) Applicant: Ford Global Technologies, LLC, Dearborn, MI (US)

(72) Inventors: Mohammad Omar Faruque, Ann Arbor, MI (US); Dean M. Jaradi, Macomb, MI (US); S. M. Iskander Farooq, Novi, MI (US); Saeed D. Barbat, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/045,960

(22) Filed: Oct. 12, 2022

(51) Int. Cl.
| | |
|---|---|
| *B60R 21/213* | (2011.01) |
| *B60R 21/00* | (2006.01) |
| *B60R 21/02* | (2006.01) |
| *B60R 21/16* | (2006.01) |
| *B60R 21/232* | (2011.01) |
| *B60R 21/2338* | (2011.01) |

(52) U.S. Cl.
CPC .......... *B60R 21/232* (2013.01); *B60R 21/213* (2013.01); *B60R 2021/0006* (2013.01); *B60R 2021/028* (2013.01); *B60R 2021/161* (2013.01); *B60R 21/2338* (2013.01); *B60R 2021/23386* (2013.01)

(58) Field of Classification Search
CPC . B60R 21/213; B60R 21/232; B60R 21/2338; B60R 2021/0006; B60R 2021/161; B60R 2021/028; B60R 2021/23386; B60R 2021/23388; B60J 5/0487
See application file for complete search history.

(56) References Cited

U.S. PATENT DOCUMENTS

| | | | | |
|---|---|---|---|---|
| 5,752,713 | A * | 5/1998 | Matsuura | .......... B60R 21/23138 |
| | | | | 280/730.2 |
| 5,924,722 | A * | 7/1999 | Koide | ................. B60R 22/1952 |
| | | | | 280/730.2 |
| 6,135,497 | A * | 10/2000 | Sutherland | .............. B60R 21/08 |
| | | | | 280/748 |
| 6,308,982 | B1 * | 10/2001 | Wallner | .............. B60R 21/2338 |
| | | | | 280/730.2 |
| 6,419,268 | B1 * | 7/2002 | Webert | ................ B60R 21/2338 |
| | | | | 280/730.2 |

(Continued)

FOREIGN PATENT DOCUMENTS

| | | |
|---|---|---|
| DE | 19642686 C1 | 12/1997 |
| WO | 2020108859 A1 | 6/2020 |

*Primary Examiner* — Laura Freedman
(74) *Attorney, Agent, or Firm* — Frank A. MacKenzie; Bejin Bieneman PLC (57) ABSTRACT

A vehicle includes a first pillar and a second pillar spaced along a vehicle-longitudinal axis. The first pillar and the second pillar define a door opening therebetween. An airbag is above the door opening in an uninflated position and is inflatable across the door opening to an inflated position. A cable is above the door opening when the airbag is in the uninflated position. The cable extends across the door opening from the first pillar to the second pillar when the airbag is in the inflated position. A pyrotechnic retractor is below the airbag and the cable when the airbag is in the uninflated position. The pyrotechnic retractor is connected to the cable.

20 Claims, 8 Drawing Sheets

(56) References Cited

U.S. PATENT DOCUMENTS

| | | | |
|---|---|---|---|
| 6,422,593 B1* | 7/2002 | Ryan | B60R 21/232 280/730.2 |
| 6,431,588 B1* | 8/2002 | Bayley | B60R 21/232 280/730.2 |
| 6,494,486 B2* | 12/2002 | Pausch | B60R 21/2338 280/730.2 |
| 6,505,853 B2* | 1/2003 | Brannon | B60R 21/232 280/730.2 |
| 6,634,671 B2* | 10/2003 | Heigl | B60R 21/232 280/730.2 |
| 6,695,341 B2 | 2/2004 | Winarto et al. | |
| 6,709,010 B2* | 3/2004 | Dominissini | B60R 22/1953 280/730.2 |
| 7,125,039 B2 | 10/2006 | Bossecker et al. | |
| 7,219,925 B2* | 5/2007 | Hill | B60R 21/055 280/730.2 |
| 7,354,083 B1 | 4/2008 | Obermann | |
| 9,327,669 B2* | 5/2016 | Jaradi | B60R 21/08 |
| 10,077,020 B2 | 9/2018 | Raikar et al. | |
| 10,501,043 B2 | 12/2019 | Ghannam et al. | |
| 10,632,951 B2 | 4/2020 | Nusier et al. | |
| 10,682,972 B2 | 6/2020 | Faruque et al. | |
| 2001/0033073 A1 | 10/2001 | Hammond et al. | |
| 2023/0182674 A1* | 6/2023 | Farooq | B60R 21/232 280/730.2 |

* cited by examiner

BODY-MOUNTED AIRBAG ABOVE DOOR OPENING

BACKGROUND

Vehicles are equipped with airbag assemblies that include an airbag and an inflator. In the event of certain vehicle impacts, the inflator activates and provides inflation medium to the airbag, which pressurizes the airbag to control the kinematics of an occupant during the vehicle impact. The airbag assemblies may be located at various positions in passenger compartment of the vehicle. Vehicles may include airbags supported on a dash, side air curtains mounted to roof rails, seat-mounted airbag, etc.

Vehicles typically include doors. The doors can be opened to allow occupants to enter and exit the vehicle. Moreover, for vehicles with side curtain airbags, the doors provide a reaction surface for the airbags.

DETAILED DESCRIPTION

A vehicle includes a first pillar and a second pillar spaced along a vehicle-longitudinal axis. The first pillar and the second pillar define a door opening therebetween. An airbag is above the door opening in an uninflated position and inflatable across the door opening to an inflated position. A cable is above the door opening when the airbag is in the uninflated position. The cable extends across the door opening from the first pillar to the second pillar when the airbag is in the inflated position. A pyrotechnic retractor is below the airbag and the cable when the airbag is in the uninflated position. The pyrotechnic retractor is connected to the cable.

The pyrotechnic retractor may be operatively connected to the cable to pull the cable downward during inflation of the airbag.

The vehicle may include a second pyrotechnic retractor below the airbag and the cable when the airbag is in the uninflated position, the second pyrotechnic retractor being connected to the cable. The pyrotechnic retractor may be fixed to the first pillar and the second pyrotechnic retractor may be fixed to the second pillar. The vehicle may include a third pillar, the second pillar being between the first pillar and the third pillar, the second pillar and the third pillar defining a second door opening therebetween. The vehicle may include a third retractor fixed to the third pillar.

The pyrotechnic retractor may be fixed to one of the first pillar and the second pillar.

The vehicle may include a removable door removably engaged with the first pillar and the second pillar and a controller programmed to: deploy the airbag and the cable in response to certain vehicle impacts and absence of the removable door from the door opening; and maintain the airbag in the uninflated position in response to a vehicle impact and presence of the removable door in the door opening.

The vehicle may include a tether extending from the pyrotechnic retractor to the airbag.

The airbag may include a loop and the cable extends through the loop. The vehicle may include a tether extending from the pyrotechnic retractor to the loop.

The vehicle may include a tether extending from the pyrotechnic retractor to the cable, the tether being connected to the cable.

The vehicle may include a front track on the first pillar and a middle track on the second pillar, the cable being movably engaged with the first pillar and the second pillar. The front track and the middle track may each be elongated upright.

The airbag may include an inflation chamber, the cable being external to the inflation chamber.

The vehicle may include a third pillar, the second pillar being between the first pillar and the third pillar, the second pillar and the third pillar defining a second door opening therebetween; and a second cable above the second door opening when the airbag is in the uninflated position, the second cable extending across the second door opening from the second pillar to the third pillar when the airbag is in the inflated position. The vehicle may include a second pyrotechnic retractor and a third pyrotechnic retractor below the airbag and the cable when the airbag is in the uninflated position, the second pyrotechnic retractor being connected to the cable and the second cable and the third pyrotechnic retractor being connected to the second cable. The pyrotechnic retractor may be fixed to the first pillar, the second pyrotechnic retractor may be fixed to the second pillar, and the third pyrotechnic retractor may be fixed to the third pillar.

The cable may be in tension between the first pillar and the second pillar when the airbag is in the inflated position.

With reference to the Figures, wherein like numerals indicate like parts throughout the several views, a vehicle 10 includes a first pillar 12 and a second pillar 12 spaced along a vehicle-longitudinal axis L. The first pillar 12 and the second pillar 12 define a door opening 14 therebetween. An airbag 16 is above the door opening 14 in an uninflated position and is inflatable across the door opening 14 to an inflated position. A cable 18 is above the door opening 14 when the airbag 16 is in the uninflated position. The cable 18 extends across the door opening 14 from the first pillar 12 to the second pillar 12 when the airbag 16 is in the inflated position. A pyrotechnic retractor 20 is below the airbag 16 and the cable 18 when the airbag 16 is in the uninflated position. The pyrotechnic retractor 20 is connected to the cable 18.

Since the cable 18 extends across the door opening 14 from the first pillar 12 to the second pillar 12 when the airbag 16 is in the inflated position, the cable 18 acts as a reaction surface for the airbag 16 in certain vehicle impacts, e.g., impacts that urge the occupant outboard toward the airbag 16. When the airbag 16 is inflated, the cable 18 backs the airbag 16 to mitigate occupant ejection. As an example, the cable 18 may back the airbag 16 to mitigate occupant ejection in examples in which a removable door 22 (discussed further below) is removed from the first pillar 12 and the second pillar 12. Since the pyrotechnic retractor 20 is connected to the cable 18, the deployment of the pyrotechnic retractor 20 pulls the cable 18 down and may assist in downward deployment of the airbag 16 before or as the airbag 16 inflates to the inflated position. The position of the cable 18 being above the door opening 14 and the pyrotechnic retractor 20 being below the airbag 16 and the cable 18 in the uninflated position alleviates packaging constraints and accommodates the operation of the airbag 16 and the cable 18.

The vehicle 10 may be any suitable type of automobile, e.g., a passenger or commercial automobile such as a sedan, a coupe, a truck, a sport utility, a crossover, a van, a minivan, a taxi, a bus, etc. The vehicle 10, for example, may be autonomous. In other words, the vehicle 10 may be autonomously operated such that the vehicle 10 may be driven without constant attention from the driver, i.e., the vehicle 10 may be self-driving without human input.

Figure 1:
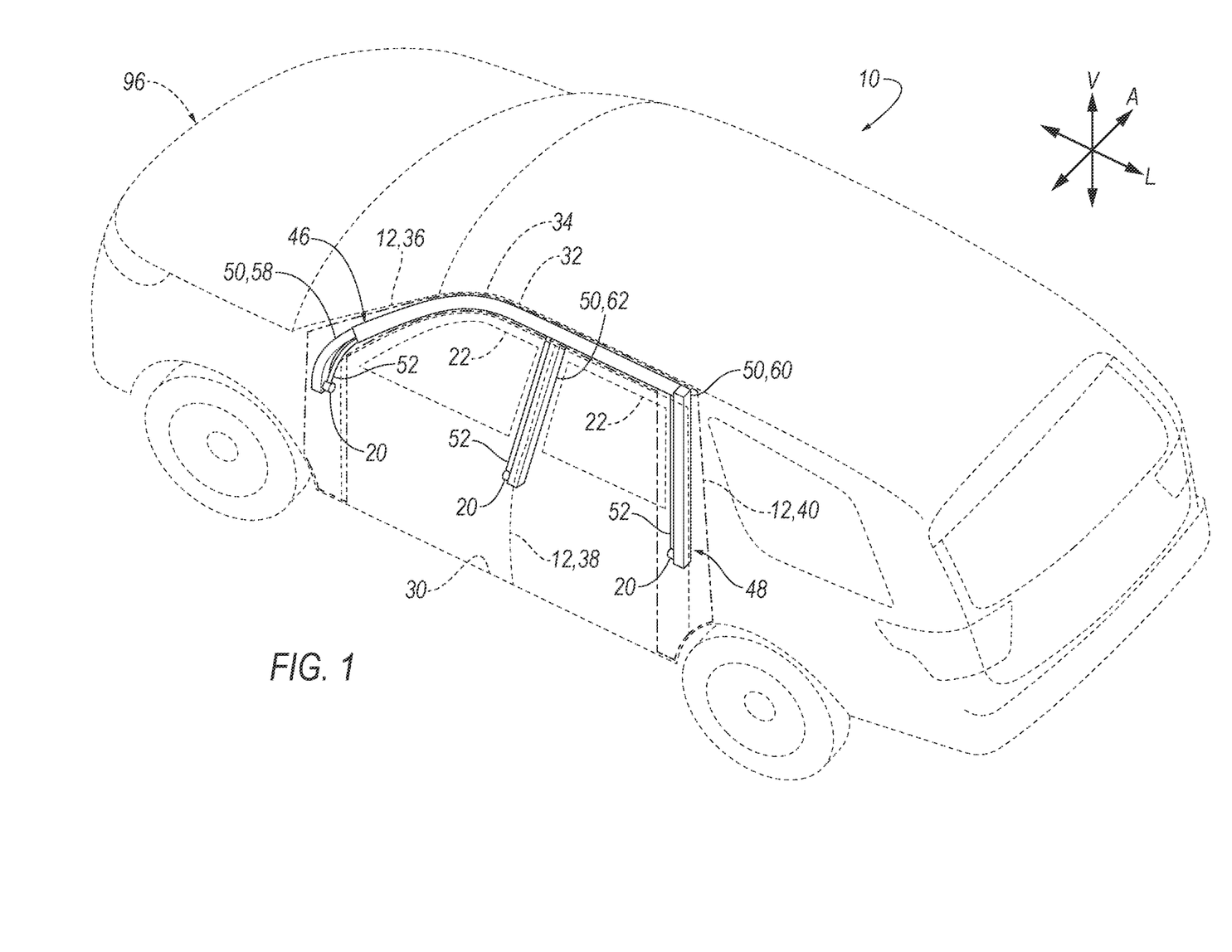
FIG. 1 is a perspective view of a vehicle having an airbag deployment assembly and an airbag assembly adjacent vehicle doors with the airbag deployment assembly in an undeployed position and the airbag assembly in an uninflated position.

With reference to FIG. 1, the vehicle 10 includes a vehicle body 96. The vehicle body 96 may be of a unibody construction in which the vehicle body 96 is unitary with a vehicle frame (including frame rails, the pillars 12, roof rails 34, etc.). As another example, the vehicle body 96 and vehicle frame may have a body-on-frame construction (also referred to as a cab-on-frame construction) in which the body and frame are separate components, i.e., are modular, and the body is supported on and affixed to the frame. Alternatively, the frame and body may have any suitable construction. The vehicle body 96 may be of any suitable material, for example, steel, aluminum, and/or fiber-reinforced plastic, etc.

The vehicle body 96 defines a passenger compartment (not numbered) to house occupants of the vehicle 10. The passenger compartment may extend across the vehicle 10, i.e., from one side to the other side of the vehicle 10. The passenger compartment includes a front end and a rear end with the front end being in front of the rear end during forward movement of the vehicle 10. The passenger compartment may house one or more seats 24, e.g., a front seat 24, 26 and a rear seat 24, 28.

The vehicle body 96 includes a floor 30 and a roof 32. The roof 32 may define the upper boundary of the vehicle body 96 and may extend from the front end of the passenger compartment to the rear end of the passenger compartment. The floor 30 is below the roof 32. The floor 30 may define the lower boundary of the vehicle body 96 and may extend from the front end of the passenger compartment to the rear end of the passenger compartment.

The roof 32 includes roof rails 34 and may include roof bows (not numbered) and a roof panel (not numbered). The roof rails 34 may be elongated along the vehicle-longitudinal axis L. The roof 32 may include two roof rails 34 with one roof rail 34 at one side of the roof 32 and the other roof rail 34 at the other side of the roof 32 spaced from each other cross-vehicle. The roof bow may be elongated in the cross-vehicle direction from one roof rail 34 to another roof rail 34. The roof 32 may include one or more roof bows. In examples including more than one roof 32 bow, the roof bows are spaced from each other along the vehicle-longitudinal axis L.

The roof panel may be disposed above the roof rails 34 and the roof bows. The roof panel may be supported by the roof rails 34 and/or the roof bows. The roof panel has a class-A surface, a finished surface exposed to view by a customer and free of unaesthetic blemishes and defects. Specifically, the class-A surface faces outwardly to the exterior of the vehicle 10. The roof rails 34, the roof bows, and/or the roof panel may be metal (e.g., aluminum, steel, etc.), composite material, e.g., fiber reinforced thermoplastic, sheet molding compound (SMC), etc., or any suitable material. In some examples, the roof panel may be a removable from the roof rails 34 and roof bows. In such examples, the roof panel may be rigid (e.g., metal, rigid polymer, composite, etc.) or the roof panel may be soft (e.g., flexible relative to the roof rails 34 and roof bows and of material such as fabric, leather, vinyl, etc.).

The vehicle 10 may include a headliner (not numbered). The headliner may be supported by the vehicle body 96. Specifically, the headliner may be supported by the roof 32, e.g., the roof rails 34, the roof bows, and/or the roof panel. In examples including the headliner, the headliner is above the passenger compartment and below the roof 32, i.e., the headliner is between the passenger compartment and the roof 32. The headliner and the roof 32 (e.g., the roof rails 34, roof bows, and/or roof panel) may define a cavity (not numbered) to house the airbag 16 in the uninflated position and the cable 18 in an undeployed position, as described further below. The headliner may define the upper boundary of the passenger compartment. The headliner includes a class-A surface facing the passenger compartment, i.e., a surface specifically manufactured to have a high quality, finished, aesthetic appearance free of blemishes. The headliner may be one of, or any combination of, e.g., plastic, foam, upholstery, etc. The airbag 16 in the uninflated position may be underneath the headliner and inflatable downwardly from the roof 32, as described further below.

With reference to FIG. 1, the vehicle 10 defines the vehicle-longitudinal axis L extending between a front end (not numbered) and a rear-end (not numbered) of the vehicle 10. The vehicle 10 defines a cross-vehicle axis A extending cross-vehicle from one side to the other side of the vehicle 10. The vehicle 10 defines a vertical axis V extending through the floor 30 and roof 32 of the vehicle 10. The vehicle-longitudinal axis L, the cross-vehicle axis A, and the vertical axis V are perpendicular relative to each other.

The vehicle body 96 include pillars 12. The pillars 12 are upright and may extend from the roof 32 to the floor 30. In the example shown in the Figures, the vehicle body 96 includes three pillars 12 on each side of the vehicle 10, namely a front pillar 12, 36, a middle pillar 12, 38, and a rear pillar 12, 40. The front pillar 12, 36 is vehicle-forward of the middle pillar 12, 38 and the rear pillar 12, 40 is vehicle-rearward of the middle pillar 12, 38. In other examples, the vehicle body 96 may include any suitable number of pillars 12 on each side of the body, i.e., two or more pillars 12.

The pillars 12 define the door opening 14 therebetween. In other words, the door opening 14 extends from one pillar 12 to the other pillar 12. In the example shown in the Figures, the vehicle body 96 defines two door openings 14 on each side of the vehicle 10. Specifically, a front door opening 14, 42 extends from the front pillar 12, 36 to the middle pillar 12, 38 and a rear door opening 14, 44 extends from the middle pillar 12, 38 to the rear pillar 12, 40. In other examples, the vehicle body 96 may define any suitable number of door openings 14, i.e., one or more. The door opening 14 extends from a sill 98 to the roof 32. The door opening 14 extends uninterrupted from one pillar 12 to another pillar 12. The door opening 14 extends uninterrupted from the sill 98 to the roof 32. The door opening 14 allows for ingress and egress into the passenger compartment.

The vehicle 10 includes the doors openable for occupants to enter and exit the occupant compartment. The roof rails 34 may contact a top edge (not numbered) of the doors when the doors are closed. Each door includes at least one door panel and may include a door-trim panel supported on the door panel. Specifically, the door may include two panels, namely a door inner and a door outer. In such an example, the door-trim panel and the door outer are fixed to the door inner. The door-trim panel is positioned opposite the door outer relative to the door frame. The door-trim panel is inboard relative to the door inner, and the door outer is outboard relative to the door inner. The door includes a window opening that may be completely closed by a window of the window is in a fully raised position. The window opening is defined by the door-trim panel and door outer on a bottom edge and either by the door inner circumscribing the window opening or by the vehicle body 96, e.g., the pillars 12 and roof rail 34. The door outer faces outboard relative to the vehicle 10.

The door outer may define a portion of the exterior of the vehicle 10. For example, the door outer may present a class-A surface, i.e., a surface specifically manufactured to have a high-quality, finished aesthetic appearance free of blemishes. The door outer may be metal (such as steel, aluminum, etc.) or polymeric (such as fiber reinforced plastic composite, etc.).

The door inner may be metal (such as steel, aluminum, etc.) or polymeric (such as fiber reinforced plastic composite, etc.). The door inner provides structural rigidity for the door outer. The door inner may provide a mounting location for components of the door 22.

The door-trim panel may include a covering. The covering may include upholstery, padding, etc. The upholstery may be cloth, leather, faux leather, or any other suitable material. The upholstery may be stitched in panels around the top roll. The padding may be between the covering and the top roll and may be foam or any other suitable material. The door-trim panel may be a material suitable for an interior of the vehicle 10, such as vinyl, plastic, leather, wood, etc.

The door-trim panel includes an armrest extending along the vehicle-longitudinal direction when the door is in the closed position. The armrest may be used by a vehicle occupant in the seat 24 adjacent the door-trim panel during operation of the vehicle 10.

Figure 2:
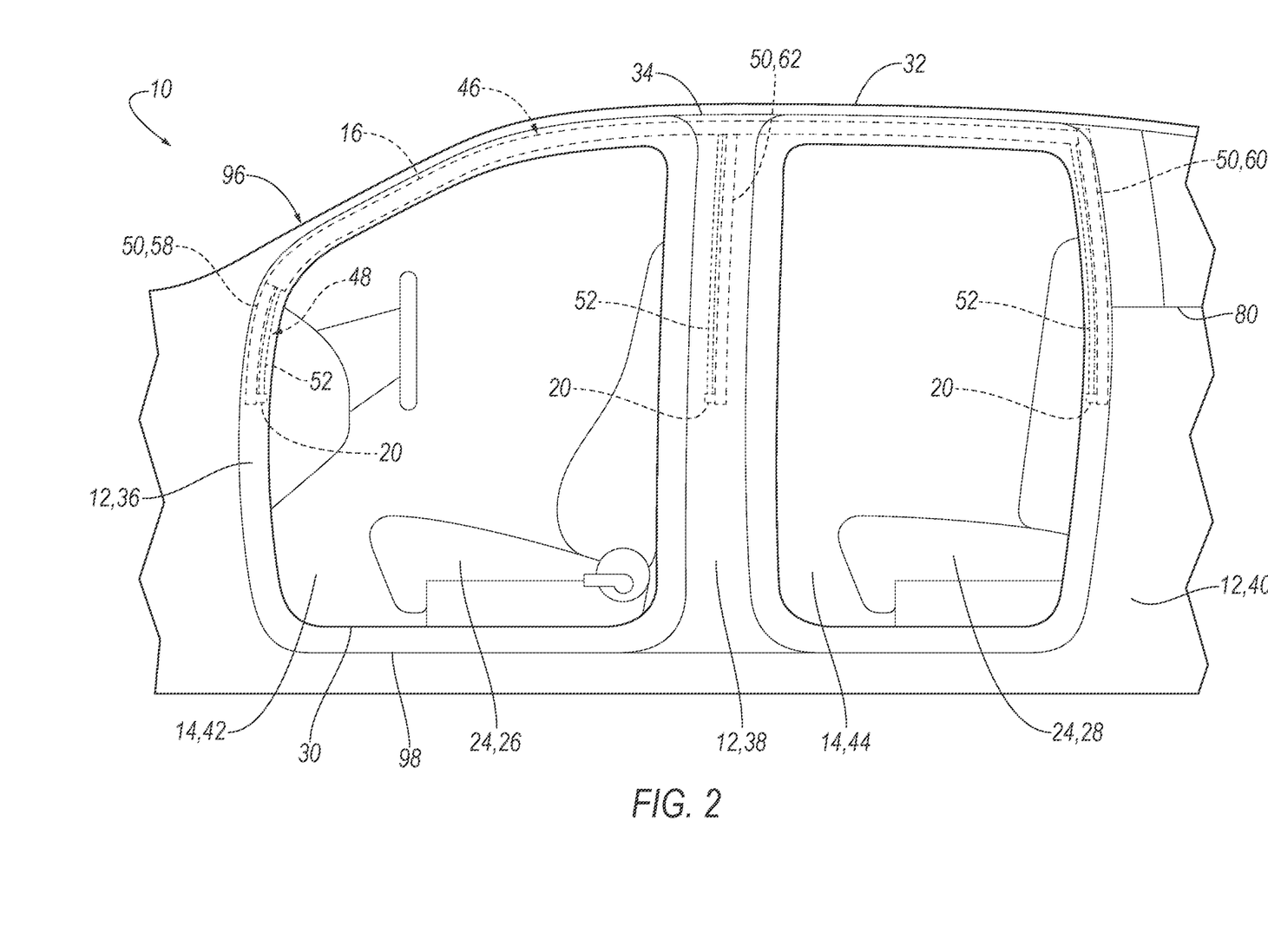
FIG. 2 is a side view of the vehicle with removable doors removed and the airbag deployment assembly in the undeployed position and the airbag assembly in the uninflated position.

With reference to FIG. 2, the door openings 14 are designed to receive the doors. One or more of the doors may be removable doors 22. For the purposes of this disclosure, "removable" as applied to the removable doors 22 is defined as detachable and re-attachable in a manner using no tools or using only tools operable by consumers in the field (i.e., tools marketed to consumers rather than automotive repair specialists) and in a manner allowing for removal and reattachment by the consumer in the field. The door opening 14 and/or the removable door 22 may be designed such that the removable doors 22 are "removable." For example, the door opening 14 and/or the removable door 22 may include hinges that are designed to be disengaged and re-engaged by a consumer, e.g., an owner of the vehicle 10, such that the vehicle 10 may be selectively operated either with or without the removable doors 22 in the door openings 14. Such hinges may, for example, include levers, latches, etc., that may be disengaged and re-engaged by hand, i.e., without tools. The vehicle 10 is designed to be operated with or without the removable doors 22 in the door openings 14.

The vehicle 10 includes an airbag assembly 46 and an airbag deployment assembly 48. The airbag deployment assembly 48 includes the cable 18, at least one retractor 20, e.g., the pyrotechnic retractor 20, and may include at least one track 50. The retractor 20 moves the cable 18 from the undeployed position to a deployed position. As set forth above, the airbag 16 is supported by the cable 18 such that the cable 18 pulls the airbag 16 downwardly as the airbag 16 inflates from the uninflated position to the inflated position. The airbag deployment assembly 48 may include a tether 52 extending from the airbag 16 to the retractor 20. One airbag assembly 46 and airbag deployment assembly 48 is shown on one side of the vehicle 10 in the Figures and the vehicle 10 may include another airbag assembly 46 and another airbag deployment assembly 48 on the other side of the vehicle 10.

Figure 3:
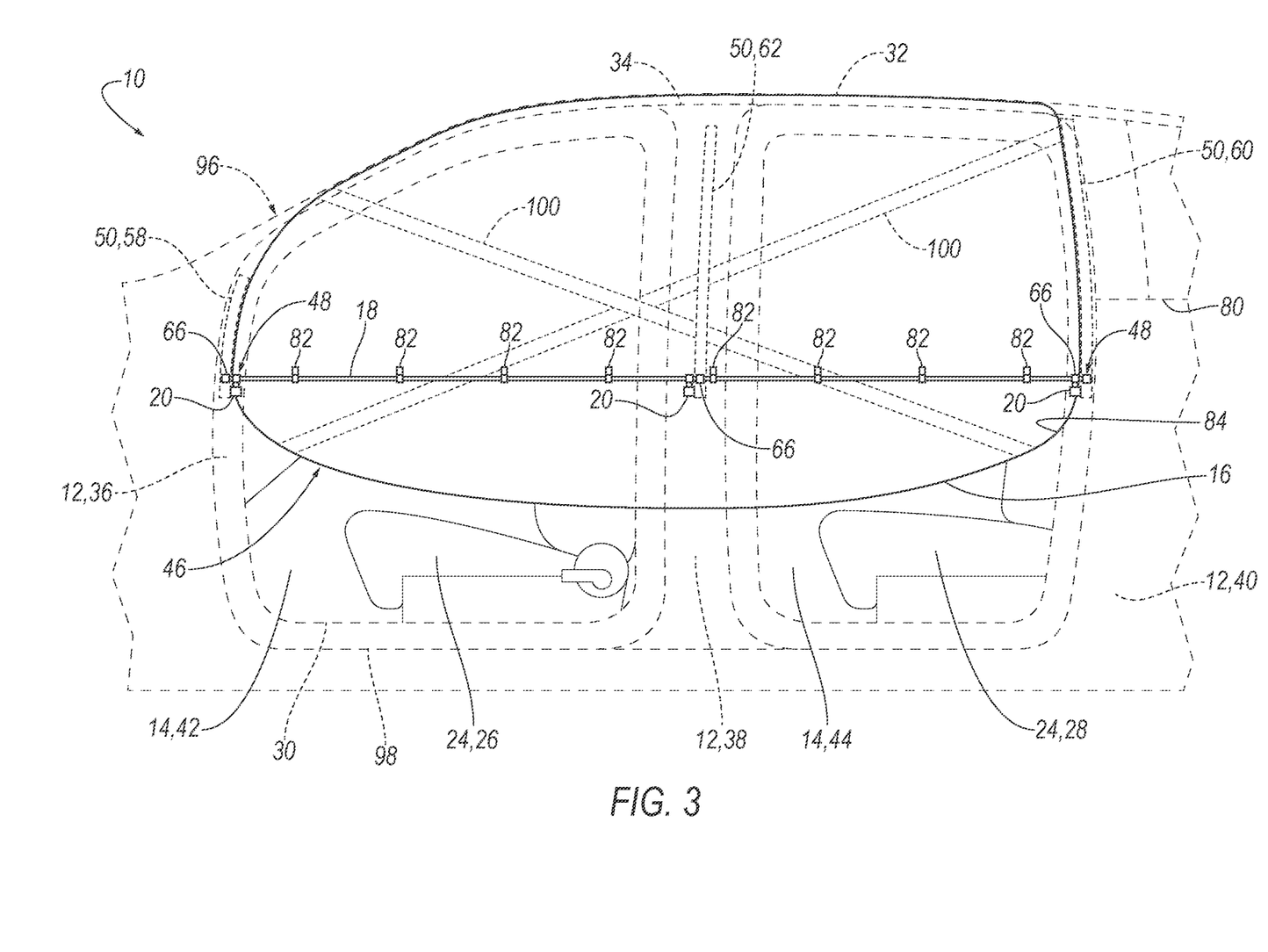
FIG. 3 is a side view of the vehicle with removable doors removed and the airbag deployment assembly in a deployed position and the airbag assembly in an inflated position.
Figure 4:
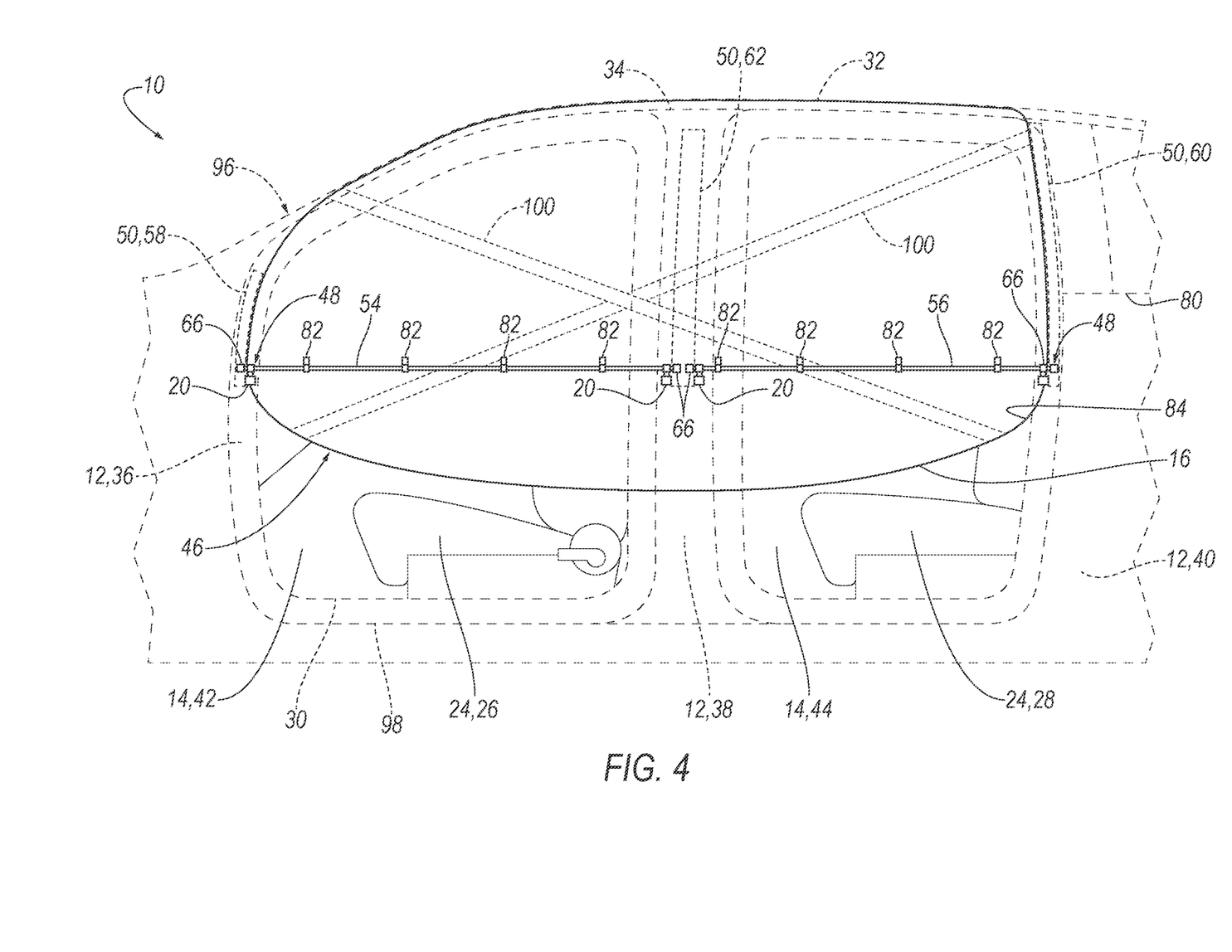
FIG. 4 is a side view of the vehicle with removable doors removed and the airbag deployment assembly in the deployed position and the airbag assembly in the inflated position.

One example of the airbag deployment assembly 48 is shown in FIG. 3 in which the airbag deployment assembly 48 includes one cable 18 extending from the front pillar 12, 36 to the rear pillar 12, 40. In that example shown in FIG. 3, the airbag deployment assembly 48 includes two pyrotechnic retractors 20, specifically one pyrotechnic retractor 20 on the front pillar 12, 36 and one pyrotechnic retractor 20 on the rear pillar 12, 40. In other examples, the airbag deployment assembly 48 may include another pyrotechnic retractor 20 on the middle pillar 12, 38 and connected to the cable 18. In other examples, the airbag deployment assembly 48 may include one pyrotechnic retractor 20 on the front pillar 12, 36 and one pyrotechnic retractor 20 on the middle pillar 12, 38 and the cable 18 may terminate at the front pillar 12, 36 and the middle pillar 12, 38. In other examples, the airbag deployment assembly 48 may include one pyrotechnic retractor 20 on the middle pillar 12, 38 and one pyrotechnic retractor 20 on the rear pillar 12, 40 and the cable 18 may terminate at the middle pillar 12, 38 and the rear pillar 12, 40. Another example of the airbag deployment assembly 48 is shown in FIG. 4 in which the airbag deployment assembly 48 includes two cables 18, 54, 56, specifically, a first cable 18, 54 and a second cable 18, 56. In such examples, the airbag 16 may be supported by both the cable 18 and the second cable 18, 56 such that both the first cable 18, 54 and the second cable 18, 56 pull the airbag 16 downwardly as the airbag 16 inflates from the uninflated position to the inflated position. In such examples, the first cable 18, 54 and the second cable 18, 56 may be generally horizontal and aligned with each other along the vehicle-longitudinal axis L.

As set forth above, the airbag deployment assembly 48 may include at least one track 50 that guides movement of the cable 18 from the undeployed position to the deployed position. In the example shown in FIG. 3, the airbag deployment assembly 48 includes two tracks 50, namely a front track 50, 58 and a rear track 50, 60. In the example shown in FIG. 4, the airbag deployment assembly 48 includes three tracks 50, namely the front track 50, 58, a middle track 50, 62 and the rear track 50, 60. The front track 50, 58 is on the front pillar 12, 36, the middle track 50, 62 on the middle pillar 12, 38, and the rear track 50, 60 is on the rear pillar 12, 40. Specifically, the front track 50, 58 is supported by the front pillar 12, 36, the middle track 50, 62 is supported by the middle pillar 12, 38, and the rear track 50, 60 is supported by the rear pillar 12, 40. The front track 50, 58 is fixed relative to the front pillar 12, 36, the middle track 50, 62 is fixed relative to the middle pillar 12, 38, and the rear track 50, 60 is fixed relative to the rear pillar 12, 40. The track 50 may be unitary with the respective pillar 12. In other words, the track 50 and the pillar 12 may be a single, uniform piece of material with no seams, joints, fasteners, or adhesives holding them together, i.e., formed together simultaneously as a single continuous unit, e.g., by stamping and/or machining from a unitary blank, molding, etc. As another example, the track 50 may be non-unitary with the pillar 12, i.e., track 50 is formed separately and subsequently fixed to the pillar 12, e.g., with threaded fasteners, welding, etc.

The tracks 50 may extend upwardly in a direction from the floor 30 toward the roof 32. Specifically, the tracks 50 may deviate from vertical due to manufacturing or architecture constraints of the vehicle body 96.

Figure 6A:
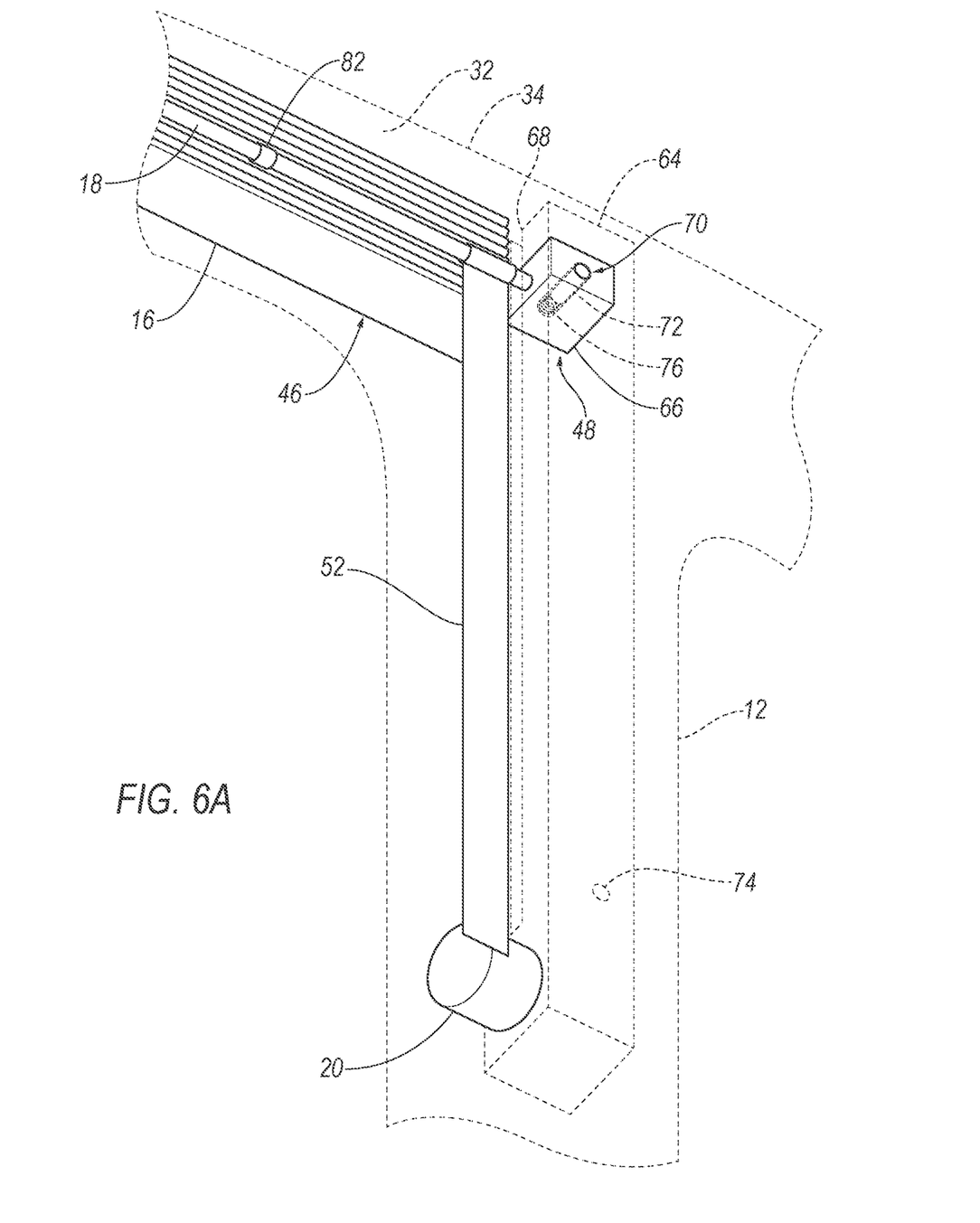
FIG. 6A Is a perspective view of the airbag deployment assembly in the undeployed position.
Figure 6B:
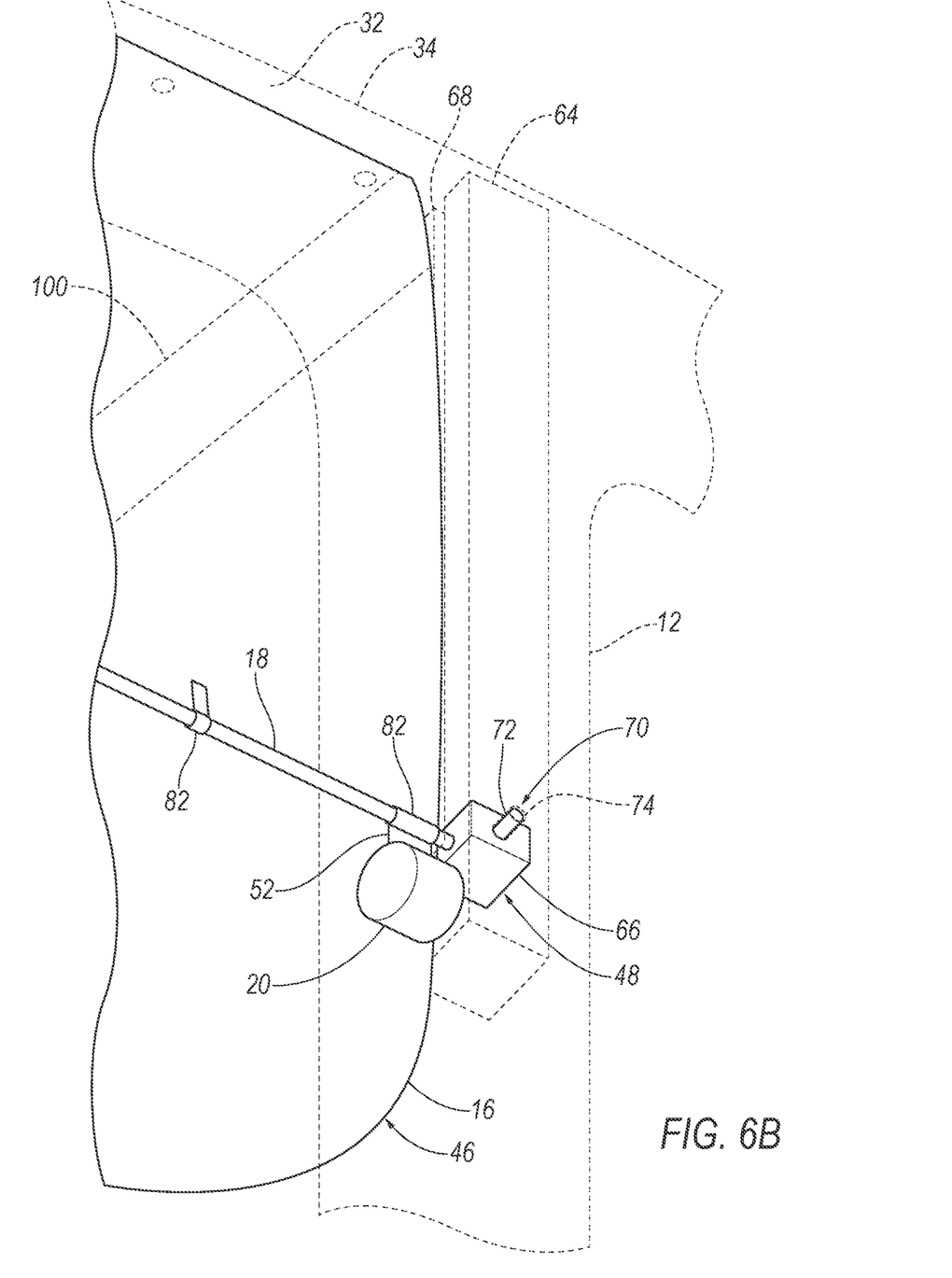
FIG. 6B is a perspective view of the airbag deployment assembly in the deployed position.
Figure 7:
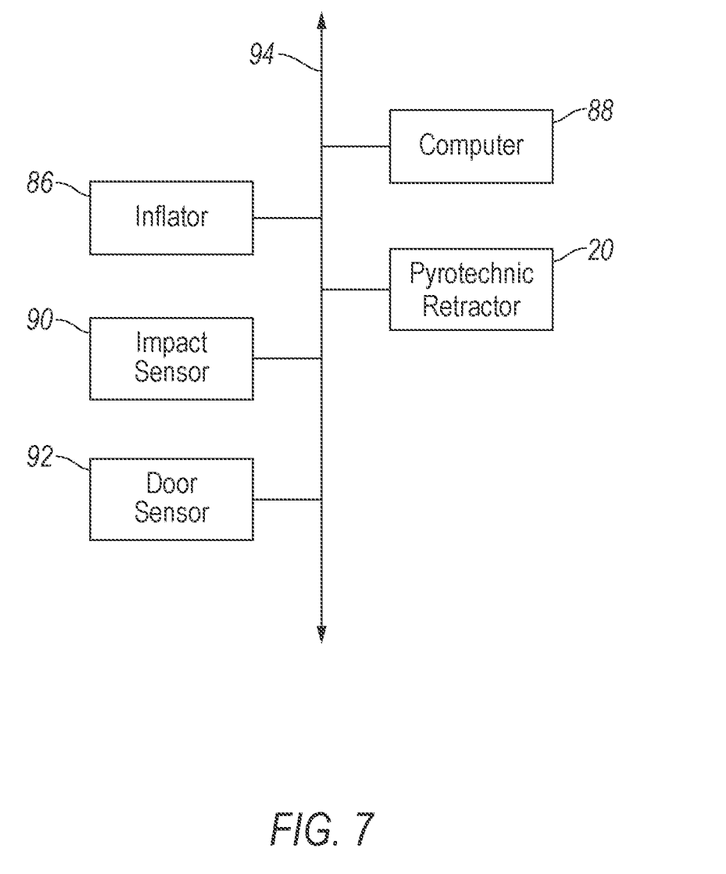
FIG. 7 is a perspective view of the vehicle having the airbag deployment assembly adjacent the vehicle doors with the airbag deployment assembly in the deployed position.

The cable 18 is moveably engaged with the tracks 50. Specifically, the cable 18 may be slideably engaged with the tracks 50. For example, the cable 18 may be retained in a channel 64 of the track 50 as the cable 18 moves from the undeployed position to the deployed position. In such an example, the cable 18 is retained in the channel 64 of the track 50 in the deployed position. As an example, the airbag deployment assembly 48 may include a shuttle 66 fixed to the cable 18 and slideably engaged with the channel 64 of the track 50. The cable 18 extends through a slot 68. One example of the track 50 on the rear pillar 12, 40 is shown in FIGS. 6A-B and it should be appreciated that the track 50 on the front pillar 12, 36 and/or the middle pillar 12, 38 may be similar or identical to the track 50, shuttle 66, etc., shown in FIGS. 6A-B. In the example shown in FIG. 4 in which the first cable 18, 54 and the second cable 18, 56 are slideably engaged with the track 50 on the middle pillar 12, 38, the airbag deployment assembly 48 may include one shuttle 66 on the track 50 of the middle pillar 12, 38 connected to both cables 18, 54, 56 or may include separate shuttles 66 on the track 50 of the middle pillar 12, 38 with each shuttle 66 dedicated to one of cables 18, 54, 56.

The track 50 and the shuttle 66 are designed to retain the shuttle 66 in the track 50 as the shuttle 66 moves with the cable 18 from the undeployed position to the deployed position. As an example, the track 50 may have the channel 64 having a C-shaped cross-section and the shuttle 66 may have a rectangular-shaped cross-section that is sized to be slideably retained in the channel 64. The track 50 has the slot 68 leading to the channel 64 and the slot 68 is narrower than the channel 64. The shuttle 66 moves as a unit with the cable 18 from the undeployed position to the raised position. The shuttle 66 may be fixed to the cable 18 in any suitable fashion, e.g., overmolding, crimping, welding, adhesive, etc.

The airbag deployment assembly 48 may include a lock 70 that locks the shuttle 66 to the track 50 in the deployed position. In the example shown in the Figures, the lock 70 includes a spring-loaded pin 72 on one of the shuttle 66 and the track 50 and a hole 74 on the other of the shuttle 66 and the track 50. In the example shown in the FIG. 6, the spring-loaded pin 72 is on the shuttle 66, i.e., with a spring 76 retained in a cavity of the shuttle 66 and the hole 74 is on the track 50. In that example, the spring-loaded pin 72 abuts the track 50 and the track 50 depresses the spring-loaded pin 72 into the cavity. The spring-loaded pin 72 rides along the track 50 downwardly as the pyrotechnic retractor 20 pulls the shuttle 66 downwardly. When the spring-loaded pin 72 reaches the hole 74, the spring 76 biases the spring-loaded pin 72 into the hole 74 to prevent the shuttle 66 from moving downwardly, e.g., during forces associated with certain vehicle impacts.

The tracks 50 may be concealed from the passenger compartment when the cables 18, 54, 56 are in the undeployed position. For example, the vehicle 10 may include trim panels (not numbered) that cover the tracks 50 in the vehicle 10. In such examples, the trim panels are releasable relative to the pillars 12 during deployment of the cables 18, 54, 56 from the undeployed position to the raised position.

When the airbag 16 is in the uninflated position, the cable 18 is above the door opening 14. For example, in the example in FIG. 3, the cable 18 is above the first door opening 14 and the second door opening 14. In the example in FIG. 4, the first cable 18, 54 is above the first door opening 14 and the second door is above the second door opening 14. The cable 18 is releasable to the vehicle body 96 above the door opening 14 when the airbag 16 is in the uninflated position. For example, the cable 18 may be connected to the roof rail 34 with releasable connections that release under forces from the pyrotechnic retractor 20 and/or inflation of the airbag 16.

The cable 18 is deployable downwardly between the pillars 12 from the undeployed position to the deployed position. For example, in the example shown in FIG. 3, the cable 18 is deployable downwardly between the front pillar 12, 36 and the rear pillar 12, 40. In the example shown in FIG. 4, the first cable 18, 54 is deployable downwardly between the front pillar 12, 36 and the middle pillar 12, 38 and the second cable 18, 56 is deployable downwardly between the middle pillar 12, 38 and the rear pillar 12, 40.

The cable 18 extends across the door opening 14 from pillar 12 to pillar 12 in the deployed position. For example, in the example shown in FIG. 3, the cable 18 extends from the front pillar 12, 36 to the rear pillar 12, 40. In the example shown in FIG. 4, the first cable 18, 54 extends from the front pillar 12, 36 to the middle pillar 12, 38 and the second cable 18, 56 extends from the middle pillar 12, 38 to the rear pillar 12, 40. The cable 18 extends continuously from pillar 12 to pillar 12 in the deployed position.

The cable 18 is vehicle-inboard of the door opening 14 when the cable 18 is in the deployed position. Specifically, the cable 18 is between the door opening 14 and the passenger compartment. In the event the door is in the door opening 14, the position of door vehicle-inboard of the door opening 14 allows the cable 18 to deploy downwardly vehicle-inboard of the door.

The cable 18 may be movably engaged with the respective pillars 12. Specifically, in the example shown in the Figures, the cable 18 is moveably engaged with the respective tracks 50. Specifically, in the example shown in FIG. 3, the cable 18 is moveably engaged with the front track 50, 58 and the rear track 50, 60. In the example shown in FIG. 4, the first cable 18, 54 is moveably engaged with the front track 50, 58 and the middle track 50, 62 and the second track 50 is moveably engaged with the middle track 50, 62 and the rear track 50, 60. The cable 18 is moveable relative to the track 50 by activation of the pyrotechnic retractor 20, as described further below.

As set forth above, the airbag 16 retractor 20 assembly includes at least one pyrotechnic retractor 20. In the event of a vehicle impact, the pyrotechnic retractor 20 pulls the airbag 16 downwardly as the airbag 16 inflates from the uninflated position to the inflated position. The pyrotechnic retractor 20 and the tether 52 may assist, for example, with positioning the airbag 16 during a vehicle impact to control the kinematics of occupants of both the front seat 24, 26 and rear seat 24, 28 in the examples shown in the Figures.

The pyrotechnic retractor 20 is fixed to one of the pillars 12. As set forth above, the airbag 16 retractor 20 assembly may include more than one pyrotechnic retractor 20. For example, in the example shown in FIG. 3, the airbag 16 retractor 20 assembly includes one pyrotechnic retractor 20 fixed to the front pillar 12, 36 and one pyrotechnic retractor 20 fixed to the rear pillar 12, 40. In the example shown in FIG. 4, the airbag 16 retractor 20 assembly includes one pyrotechnic retractor 20 fixed to the front pillar 12, 36, one pyrotechnic retractor 20 fixed to the rear pillar 12, 40, and one pyrotechnic retractor 20 fixed to the middle pillar 12, 38. The pyrotechnic retractor 20 may be fixed to the respective pillar 12 in any suitable fashion, e.g., threaded fasteners, brackets, welding, etc.

The pyrotechnic retractor 20 is below the airbag 16 and the cable 18 when the airbag 16 is in the uninflated position. Specifically, the pyrotechnic retractor 20 is vertically lower than the airbag 16 and the cable 18. In some examples, the pyrotechnic retractor 20 may be directly beneath, i.e., lower than and vertically aligned with, the airbag 16 and the cable 18. The pyrotechnic retractor 20 may be fixed to the respective pillar 12 below a beltline 80 of the vehicle body 96. The beltline 80 of the vehicle body 96 is the portion of the vehicle body 96, e.g. the doors, that meet the bottom of side windows on the side of the vehicle body 96.

The pyrotechnic retractor 20 is connected to the cable 18. Specifically, the pyrotechnic retractor 20 is operatively connected to the cable 18 to pull the cable 18 downward during inflation of the airbag 16. The pyrotechnic retractor 20 may be directly or indirectly connected to the cable 18. In the example shown in the Figures, the pyrotechnic retractor 20 is indirectly connected to the cable 18. Specifically, the tether 52 extends from the pyrotechnic retractor 20 to the airbag 16 and the airbag 16 is connected to the cable 18. During deployment of the pyrotechnic retractor 20, the pyrotechnic retractor 20 retracts the tether 52, the tether 52 pulls the airbag 16 downwardly, and the airbag 16 pulls the cable 18 downwardly along the tracks 50. Specifically, in the example shown the Figures, the airbag 16 pulls the cable 18 downwardly and the cable 18 pulls the shuttle 66 downwardly along the track 50. As another example, the tether 52 may extend from the pyrotechnic retractor 20 to the cable 18 and the pyrotechnic retractor 20 retracts the tether 52 into the pyrotechnic retractor 20 to pull the cable 18 downward. In such an example, the tether 52 extends from the pyrotechnic retractor 20 to the shuttle 66 and, as set forth below, the shuttle 66 is fixed to the cable 18. In examples including more than one pyrotechnic retractor 20, each of the pyrotechnic retractors 20 is connected to the cable 18, and more specifically operatively connected to the cable 18 to pull the cable 18 downward during inflation of the airbag 16. In examples including more than one pyrotechnic retractor 20, the pyrotechnic retractors 20 may be activated simultaneously to pull the cable 18 downwardly.

The airbag 16 may include at least one loop 82 and the cable 18 extends through the loop 82 to connect the cable 18 to the airbag 16. The cable 18 and the airbag 16 move as a unit downwardly relative to the pillars 12 upon activation of the pyrotechnic retractor 20. The loop 82 is external the airbag 16, i.e., external of an inflation chamber of the airbag 16. In the example shown in the Figures, the airbag 16 includes multiple loops 82 spaced from each other along the vehicle-longitudinal axis L and the cable 18 extends through each of the loops 82. The loop 82 is endless. The loop 82 may be connected to a panel 84 of the airbag 16 by, for example, stitching, adhesive, ultrasonic welding, etc. The loop 82 may be fabric, and specifically, may be the same material type as panels 84 of the airbag 16.

As set forth above, in the example shown in the Figures, the pyrotechnic retractor 20 is connected to the airbag 16 and pulls the airbag 16 downwardly. In examples including tethers 50, the tether 52 may extend from the pyrotechnic retractor 20 to the airbag 16. Specifically, the tether 52 may extend from the pyrotechnic retractor 20 to one of the loops 82 of the airbag 16. The tether 52 may be connected to the loop 82 by, for example, stitching, adhesive, ultrasonic welding, etc. In other examples, the tether 52 may extend from the pyrotechnic retractor 20 to the cable 18, e.g., directly to the cable 18 and/or to the shuttle 66.

The tether 52 may be disposed along the pillar 12 between the pillar 12 and a trim panel on the pillar 12. In other words, the trim panel may conceal the tether 52 in the undeployed position. During inflation of the airbag 16 and retraction of the tether 52, the tether 52 breaks the trim panel, e.g., by releasing the trim panel from the pillar 12, splitting a tear seam on the trim panel, etc.

The cable 18 may be in tension between the pillars 12 in the deployed position. In the example shown in the Figures, the length of the cable 18 and the spacing of the pillars 12 are sized such that the cable 18 is in tension between the pillars 12 in the deployed position. The tension in the cable 18 in the deployed position transmits forces from the cables 18, 54, 56 to the pillars 12 during certain vehicle impacts, e.g., a side impact. The tension in the cable 18 allows for the cable 18 to support the airbag 16 when the cable 18 is in the deployed position and the airbag 16 is in the inflated position. Specifically, the cable 18 acts as a reaction surface for the airbag 16.

The pyrotechnic retractor 20 may be pyrotechnically activated to pull the cable 18 downward as the airbag 16 inflates to the inflated position. In such an example, the pyrotechnic retractor 20 includes a housing (not numbered) and a pyrotechnic charge (not numbered) in the housing. The pyrotechnic charge is activated to retract the tether 52. The pyrotechnic retractor 20 may be, for example, a rotary retractor 20. The pyrotechnic charge is combustible to produce a gas, e.g., to retract a piston or turn a wheel, to retract the tether 52 into the housing of the pyrotechnic retractor 20. The pyrotechnic charge may be a solid mixture of substances that, when ignited, retract to produce the gas. For example, the pyrotechnic charge may be formed of sodium azide (NaNO3), potassium nitrate (KNO3), and silicon dioxide (SiO2), which react to form nitrogen gas (N2).

As set forth above, the vehicle 10 includes the airbag assembly 46 mounted to the vehicle body 96. The airbag assembly 46 includes the airbag 16 and at least one inflator 86 to inflate the airbag 16. The inflator 86 is in fluid communication with the airbag 16, as set forth below. As described further below, the airbag 16 is mounted to the vehicle body 96 above the door opening 14. Specifically, the airbag 16 may be mounted above the headliner. In the uninflated position, the airbag 16 is above the door opening 14 and the second door opening 14, e.g., on the roof 32. In the uninflated position the airbag 16 may be elongated along the vehicle-longitudinal axis L. The airbag 16 is inflatable downwardly between the passenger compartment and the door opening 14 and second door opening 14 from the uninflated position to the inflated position. The airbag 16 being above the headliner alleviates packaging constraints and accommodates the operation of the airbag 16. In the event of a vehicle-side impact, the airbag 16 inflates to the inflated position to control the kinematics of the occupants of the passenger compartment.

The airbag 16 is above the door opening 14 in the uninflated position. Specifically, in the uninflated position, the airbag 16 may be rolled and/or folded on the vehicle body 96, e.g., on the roof 32. In the example shown in FIG. 5, the airbag 16 may be packaged above the door opening 14 and the second door opening 14. In the uninflated position, the airbag 16 may be between the headliner and the roof 32.

The airbag 16 is inflatable across the door opening 14 to the inflated position. Specifically, the airbag 16 covers at least a portion of the door opening 14 in the inflated position. In some examples, including those shown in the Figures, the airbag 16 may extend from pillar 12 to pillar 12 and, more specifically, may overlap the pillars 12 vehicle-inboard of the pillars 12. The airbag 16 is deployable downwardly across the door opening 14.

As set forth above, the inflator 86 is in fluid communication with the airbag 16. Upon receiving a signal from, e.g., a controller (as described further below), the inflator 86 expands the airbag 16 with inflation medium, such as a gas, to move the airbag 16 from the uninflated position to the inflated position. The inflator 86 may be supported by any suitable component, e.g., the roof 32, such as the roof rail 34. The inflator 86 may be, for example, a pyrotechnic inflator 86 that ignites a chemical reaction to generate the inflation medium, a stored gas inflator 86 that releases (e.g., by a pyrotechnic valve) stored gas as the inflation medium, or a hybrid. The inflator 86 may be, for example, at least partially in the inflation chamber to deliver inflation medium directly to the inflation chamber or may be connected to the inflation chamber through fill tubes, diffusers, etc. Specifically, the inflator 86 may be fixed to the vehicle body 96 and connected with the inflation chamber through fill tubes and/or diffusers that move with the airbag 16 as the airbag 16 is lowered relative to the vehicle body 96 from the uninflated position to the inflated position.

As set forth above, the airbag 16 includes the inflation chamber. In the example shown in the Figures, inflation medium from the inflator 86 flows through the inflation chamber. The inflation chamber may have internal baffles, an internal tether 100, etc. that guides the flow of inflation medium and/or control the shape of the inflation chamber. As the pressure is increased in the inflation chamber, the airbag 16 breaks through a tear seam (not numbered) of the headliner. The inflation chamber is positioned to control the kinematics of the occupants. As set forth above, the cable 18 may be external to the inflation chamber.

The airbag 16 may be fabric, e.g., a woven polymer yarn. The woven polymer yarn may be, for example, nylon 6, 6. Other examples of the woven polymer yarn include polyether ether ketone (PEEK), polyetherketoneketone (PEKK), polyester, etc. The woven polymer yarn may include a coating, such as silicone, neoprene, urethane, etc. For example, the coating may be polyorgano siloxane.

With reference to the Figures, the vehicle 10 includes a computer 88 that controls the deployment of the cable 18 inflation of the airbag 16 based on input from impact sensors 90. Use of "in response to," "based on," and "upon determining" herein indicates a causal relationship, not merely a temporal relationship. The computer 88 may be, for example, a restraints control module. The computer 88 includes a processor and a memory. The memory includes one or more forms of computer 88 readable media, and stores instructions executable by the computer 88 for performing various operations, including as disclosed herein. For example, the computer 88 can be a generic computer 88 with a processor and memory as described above and/or may include an electronic control unit ECU or controller for a specific function or set of functions, and/or a dedicated electronic circuit including an ASIC that is manufactured for a particular operation, e.g., an ASIC for processing sensor data and/or communicating the sensor data. In another example, the computer 88 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in a computer 88. The memory can be of any type, e.g., hard disk drives, solid state drives, servers, or any volatile or non-volatile media. The memory can store the collected data sent from the sensors. The memory can be a separate device from the computer 88, and the computer 88 can retrieve information stored by the memory via a network in the vehicle 10, e.g., over a CAN bus, a wireless network, etc. The computer 88 is generally arranged for communications on a vehicle communication network 94 that can include a bus in the vehicle 10 such as a controller area network CAN or the like, and/or other wired and/or wireless mechanisms. Alternatively or additionally, in cases where the computer 88 includes a plurality of devices, the vehicle communication network 94 may be used for communications between devices represented as the computer 88 in this disclosure. Further, as mentioned below, various controllers and/or sensors may provide data to the computer 88 via the vehicle communication network 94.

The vehicle 10 may include at least one impact sensor 90 for sensing certain impacts of the vehicle 10. The impact sensor 90 is in communication with the computer 88. The computer 88 may activate the actuator, e.g., provide an impulse to a pyrotechnic charge of the inflator 86 when the impact sensor 90 senses pedestrian impact. The impact sensor 90 is configured to detect an impact to the vehicle 10. The impact sensor 90 may be of any suitable type, for example, post-contact sensors such as accelerometers, pressure sensors, and contact switches; and pre-impact sensors 90 such as radar, LIDAR, and vision-sensing systems. The vision-sensing systems may include one or more cameras, CCD image sensors, CMOS image sensors, etc. The impact sensor 90 may be located at numerous points in or on the vehicle 10.

Figure 5:
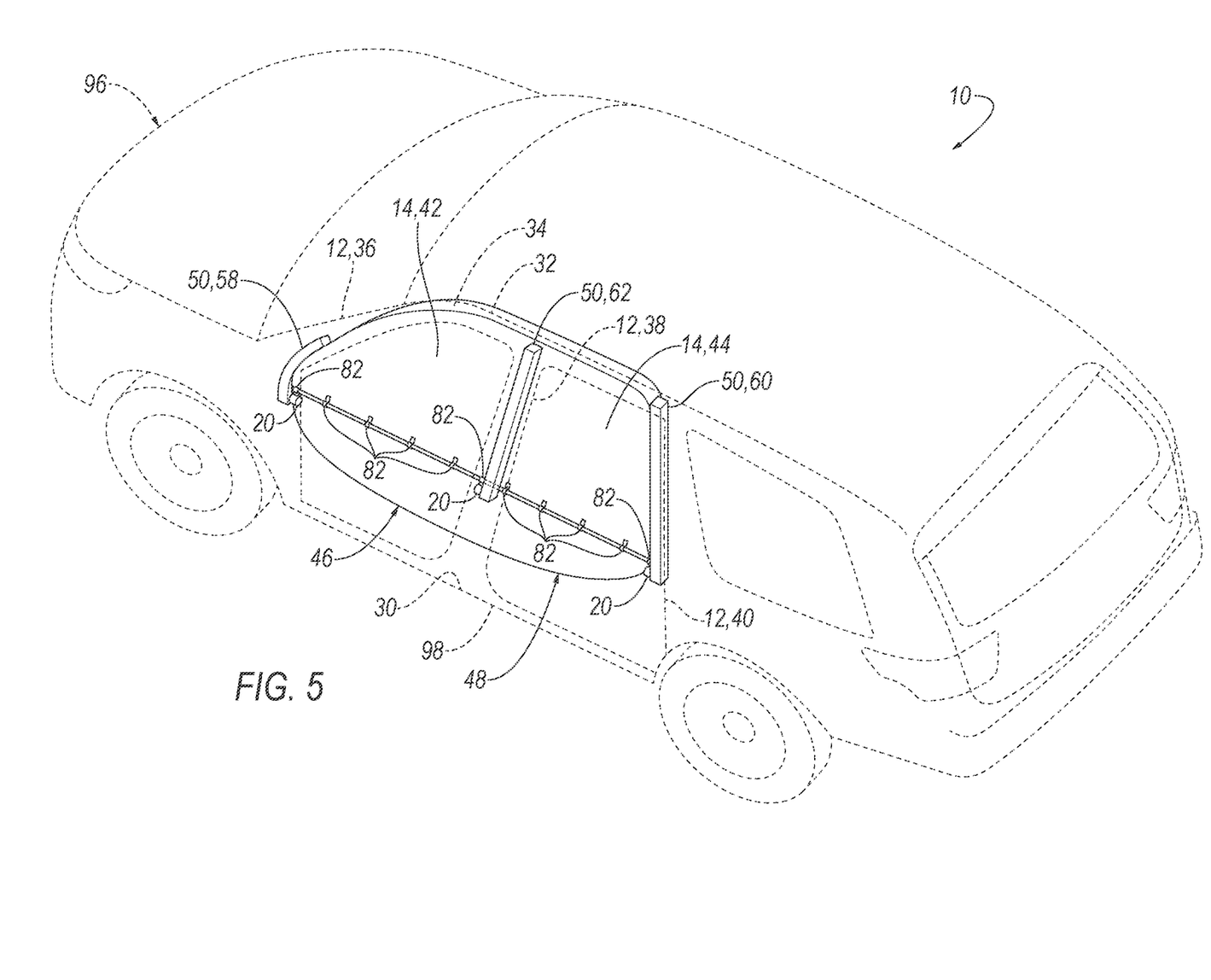
FIG. 5 a perspective view of the vehicle having the airbag deployment assembly in the undeployed position and the airbag assembly in the uninflated position.

With reference to FIG. 5, a door sensor 92 is configured to detect the presence of each removable door 22 in the corresponding door opening 14. For example, the door sensor 92 may be a button positioned where the removable door 22, if present, will press the button. The door sensor 92 may be placed, e.g., near a hinge of the removable door 22 so that the removable door 22 presses the door sensor 92 regardless of whether the removable door 22 is open or closed, or the door sensor 92 may register the removable door 22 as present only when closed and as absent either when removed or when open. For another example, the door sensor 92 may be a sensor, e.g., a voltmeter, ammeter, ohmmeter, etc., that registers a value of an electrical variable, e.g., voltage, current, resistance, etc., in an electrical circuit that includes circuit elements in the removable door 22. Values of the electrical variable corresponding to an open circuit may be classified as the removable door 22 being absent, and values of the electrical variable corresponding to a closed circuit may be classified as the removable door 22 being present.

During certain vehicle impacts, the airbag 16 is inflated from the uninflated position, as shown in FIG. 1, to the inflated position, as shown in FIGS. 2-5. The tether 52 retractor 20 retracts the tether 52 to pull the airbag 16 downwardly along a body side between the front seat 24, 26 and the body and between the rear seat 24, 28 and the body side. Specifically, the computer 88 activates the inflator 86 and the pyrotechnic retractor 20 to inflate the airbag 16 and the pull the airbag 16 downwardly.

In examples in which the doors are removable doors 22, the controller may be programmed to deploy the airbag 16 and the cable 18 in response to certain vehicle impacts and in the absence of the removable door 22 from the door opening 14. Specifically, in such an example, the controller is programmed to maintain the airbag 16 in the uninflated position and maintain the cable 18 in the undeployed position in response to certain vehicle impacts and presence of the removable door 22 in the door opening 14. In such an example, the controller only deploys the airbag 16 and the cable 18 if the removable door 22 is removed from the door opening 14. Said differently, when the vehicle 10 is being operated with the removable doors 22 attached to the vehicle body 96 in the door opening 14, the controller does not deploy the cable 18 and the airbag 16 in response to certain vehicle impacts. The deployment of the cable 18 to the deployed position is performed by operation of the pyrotechnic retractor 20, as set forth above. The inflation of the airbag 16 is performed by the inflator 86, as set forth above. The detection of the presence of the door is made with the door sensor 92, as described above. The detection of certain vehicle impacts is made with the impact sensor 90, as described above.

The adjectives "first," "second," "third," etc., used herein, including with reference to the pillars, cables, and door openings, are used merely as identifiers and do not indicator order or importance. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
   a first pillar and a second pillar spaced along a vehicle-longitudinal axis, the first pillar and the second pillar defining a door opening therebetween;
   an airbag above the door opening in an uninflated position and inflatable across the door opening to an inflated position;
   a cable above the door opening when the airbag is in the uninflated position, the cable extending across the door opening from the first pillar to the second pillar when the airbag is in the inflated position;
   a pyrotechnic retractor below the airbag and the cable when the airbag is in the uninflated position, the pyrotechnic retractor being connected to the cable; and
   a tether extending from the pyrotechnic retractor to the cable, the tether being connected to the cable.

2. The vehicle of claim 1, wherein the pyrotechnic retractor is operatively connected to the cable to pull the cable downward during inflation of the airbag.

3. The vehicle of claim 1, further comprising a second pyrotechnic retractor below the airbag and the cable when the airbag is in the uninflated position, the second pyrotechnic retractor being connected to the cable.

4. The vehicle of claim 3, wherein the pyrotechnic retractor is fixed to the first pillar and the second pyrotechnic retractor is fixed to the second pillar.

5. The vehicle of claim 4, further comprising a third pillar, the second pillar being between the first pillar and the third pillar, the second pillar and the third pillar defining a second door opening therebetween.

6. The vehicle of claim 5, further comprising a third retractor fixed to the third pillar.

7. The vehicle of claim 1, wherein the pyrotechnic retractor is fixed to one of the first pillar and the second pillar.

8. The vehicle of claim 1, further comprising:
   a removable door removably engaged with the first pillar and the second pillar; and
   a controller programmed to:
      deploy the airbag and the cable in response to a vehicle impact and absence of the removable door from the door opening; and
      maintain the airbag in the uninflated position in response to certain vehicle impacts and presence of the removable door in the door opening.

9. The vehicle of claim 1, further comprising a first track on the first pillar and a second track on the second pillar, the cable being movably engaged with the first pillar and the second pillar.

10. The vehicle of claim 9, wherein the first track, and the second track are each elongated upright.

11. The vehicle of claim 1, wherein the airbag includes an inflation chamber, the cable being external to the inflation chamber.

12. The vehicle of claim 1, further comprising:
    a third pillar, the second pillar being between the first pillar and the third pillar, the second pillar and the third pillar defining a second door opening therebetween; and
    a second cable above the second door opening when the airbag is in the uninflated position, the second cable extending across the second door opening from the second pillar to the third pillar when the airbag is in the inflated position.

13. The vehicle of claim 12, further comprising a second pyrotechnic retractor and a third pyrotechnic retractor below the airbag and the cable when the airbag is in the uninflated position, the second pyrotechnic retractor being connected to the cable and the second cable, and the third pyrotechnic retractor being connected to the second cable.

14. The vehicle of claim 13, wherein the pyrotechnic retractor is fixed to the first pillar, the second pyrotechnic retractor is fixed to the second pillar and the third pyrotechnic retractor is fixed to the third pillar.

15. The vehicle of claim 1, wherein the cable is in tension between the first pillar and the second pillar when the airbag is in the inflated position.

16. The vehicle of claim 1, wherein the cable is directly connected to fabric of the airbag.

17. A vehicle comprising:
    a first pillar and a second pillar spaced along a vehicle-longitudinal axis, the first pillar and the second pillar defining a door opening therebetween;
    an airbag above the door opening in an uninflated position and inflatable across the door opening to an inflated position;

a cable above the door opening when the airbag is in the uninflated position, the cable extending across the door opening from the first pillar to the second pillar when the airbag is in the inflated position;

a pyrotechnic retractor below the airbag and the cable when the airbag is in the uninflated position, the pyrotechnic retractor being connected to the cable; and a tether extending from the pyrotechnic retractor to the airbag.

18. The vehicle of claim 17, wherein the airbag includes a loop and the cable extends through the loop, the tether extending from the pyrotechnic retractor to the loop.

19. A vehicle comprising:

a first pillar and a second pillar spaced along a vehicle-longitudinal axis, the first pillar and the second pillar defining a door opening therebetween;

an airbag above the door opening in an uninflated position and inflatable across the door opening to an inflated position;

a cable above the door opening when the airbag is in the uninflated position, the cable extending across the door opening from the first pillar to the second pillar when the airbag is in the inflated position;

a pyrotechnic retractor below the airbag and the cable when the airbag is in the uninflated position, the pyrotechnic retractor being connected to the cable; and a first track on the first pillar and a second track on the second pillar, the cable being movably engaged with the first pillar and the second pillar.

20. The vehicle of claim 19, wherein the cable is in tension between the first track and the second track when the airbag is in the inflated position.

\* \* \* \* \*